United States Patent

[11] 3,545,335

| [72] | Inventor | Robert A. Lehmkuhl |
| | | Cincinnati, Ohio |
| [21] | Appl. No. | 781,567 |
| [22] | Filed | Dec. 5, 1968 |
| [45] | Patented | Dec. 8, 1970 |
| [73] | Assignee | The Carlton Machine Tool Company |
| | | Cincinnati, Ohio |
| | | a corporation of Ohio |

[54] SPINDLE CLAMP
5 Claims, 11 Drawing Figs.
[52] U.S. Cl. .................................................. 90/11, 77/3
[51] Int. Cl. .................................................. B23c 1/02;
B23b 39/02
[50] Field of Search ........................................ 90/11.1, 11, 14; 77/3; 82/31

[56] References Cited
UNITED STATES PATENTS

| 2,957,393 | 10/1960 | Kampmeier | 90/11.1 |
| 3,103,144 | 9/1963 | Walter | 90/11 |
| 3,222,991 | 12/1965 | Bone | 90/11.1 |
| 3,397,614 | 8/1968 | Meinke | 90/11 |

Primary Examiner—Gil Weidenfeld
Attorney—Edward J. Utz

ABSTRACT: A spindle clamp for a machine tool for centering the spindle with sufficient rigidity in the radial direction to resist cutting loads and with sufficient rigidity to resist axial cutting loads utilizing a pressure cylinder for distorting the sleeve in which said spindle is carried and circular wedges for centering the spindle.

INVENTOR.
ROBERT A. LEHMKUHL.
ATTORNEY

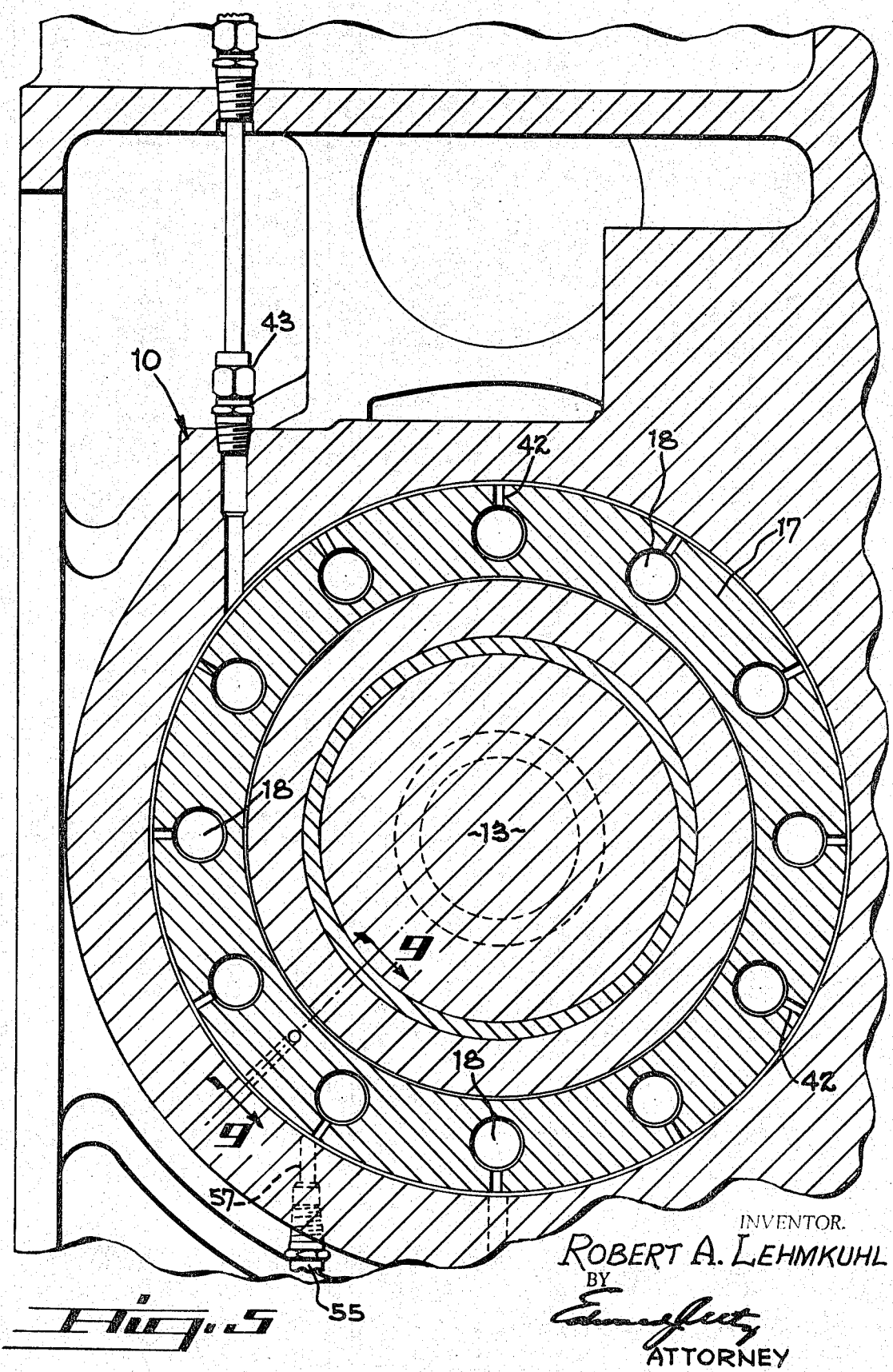

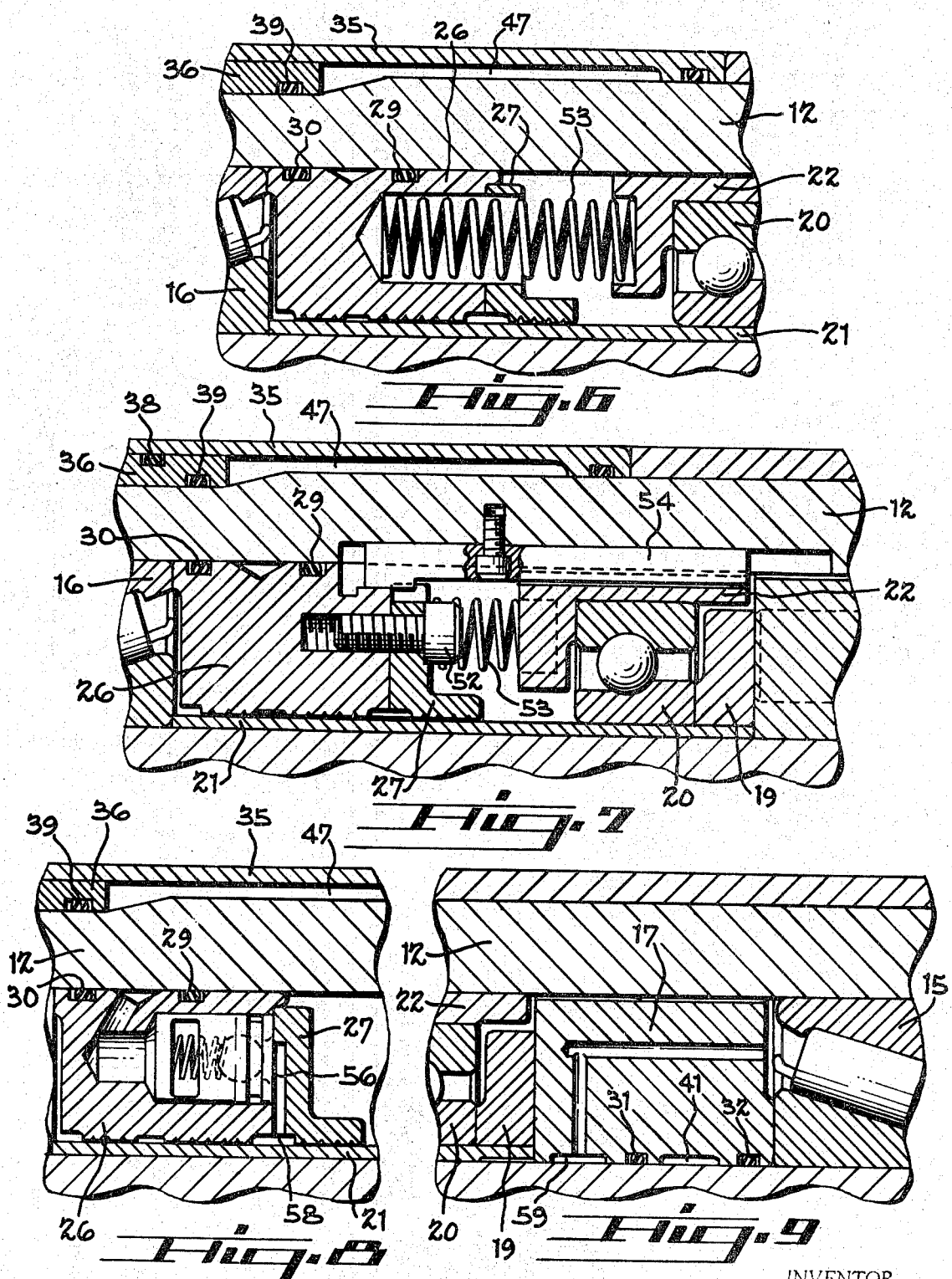

INVENTOR.
ROBERT A. LEHMKUHL.
BY
Edward J. Utz
ATTORNEY

SPINDLE CLAMP

My invention relates to a power operated spindle clamp suitable for use with horizontal boring machines, and other machine tools having power type spindles.

The principal object of my invention is to provide a clamp capable of centering the spindle with sufficient rigidity in the radial direction to resist cutting loads and with sufficient rigidity to resist axial cutting loads.

Another object of my invention is to provide a clamping mechanism and spindle mechanism which is self-centering in the radial direction.

Another object of my invention is to eliminate the clearance which exists between the supporting sleeve and the spindle and to center the spindle within the clearances so that the spindle center line in rotation is within the true center line of the bearings in which the supporting sleeve is mounted.

Another object of my invention is to provide a design which will result in a rigid centering device with relatively simple circular parts.

Another object of my invention is to provide wedges which in conjunction with a deformable sleeve operate to clamp and center the spindle.

Another object of my invention is the provision of a technique for forced multiplying and transferring force from a stationary to a rotating member.

In the drawings the same reference numerals refer to the same or similar parts throughout the several views, and the sectional views are taken looking in the direction of the arrows at the end of the section lines.

FIG. 5 is a detailed sectional view taken along the lines 5–5 of FIG. 2.

FIG. 6 is a detailed sectional view taken along the lines 6–6 of FIG. 4.

FIG. 7 is a detailed sectional view taken along the lines 7–7 of FIG. 4.

FIG. 8 is a detailed sectional view taken along the lines 8–8 of FIG. 4.

FIG. 9 is a detailed sectional view taken along the lines 9–9 of FIG. 5.

In my invention I employ a column upon which a head containing the clamp is slidably mounted. Within the head a tool carrying spindle is provided and my invention is particularly concerned with clamping the spindle. The spindle is driven through suitable gear mechanism and I provide means for clamping it in any of its extended or rest positions. I provide a low-pressure cylinder which has a piston and a high-pressure cylinder which also has a piston. Oil is introduced into the low-pressure cylinder and serves to transfer the piston thrust into the high-pressure piston area and subsequently the oil is transferred into a clamping area chamber. The actuation of clamping wedges by the pressure exerted causes the spindle to be clamped and centered within the sleeve.

Figure 1:
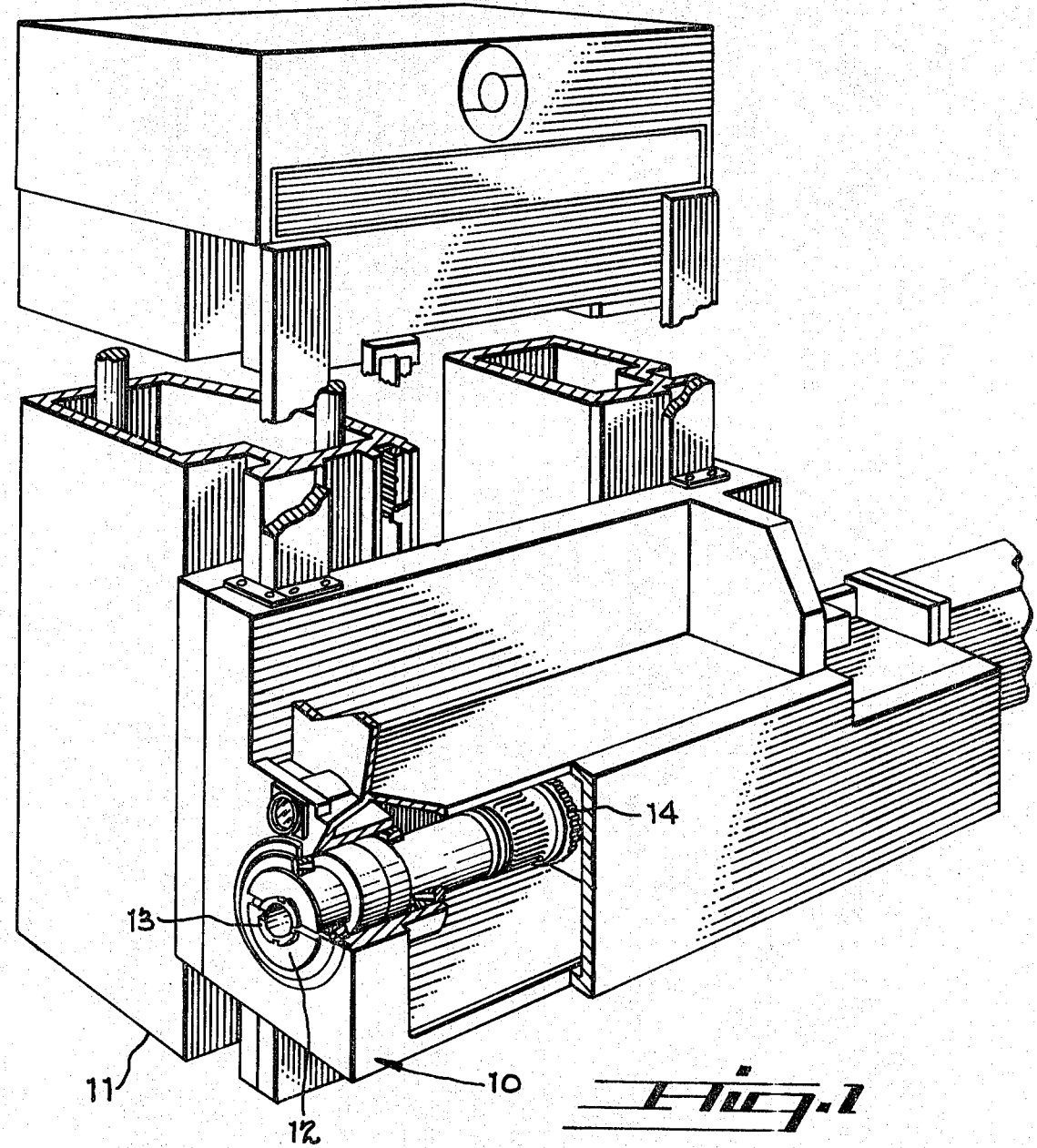
FIG. 1 shows the head with the clamp unit indicated in section.

In the drawings I show at FIG. 1 the head 10 embodying the clamp of my invention slidably mounted upon the column 11. A supporting sleeve 12 carries a spindle 13 which is driven through suitable gear mechanism illustrated at 14. The spindle 13 is slidable within the sleeve 12. This slidability requires clearance between spindle 13 and sleeve 12. This clearance is removed by the centering and clamping action.

Figure 2:
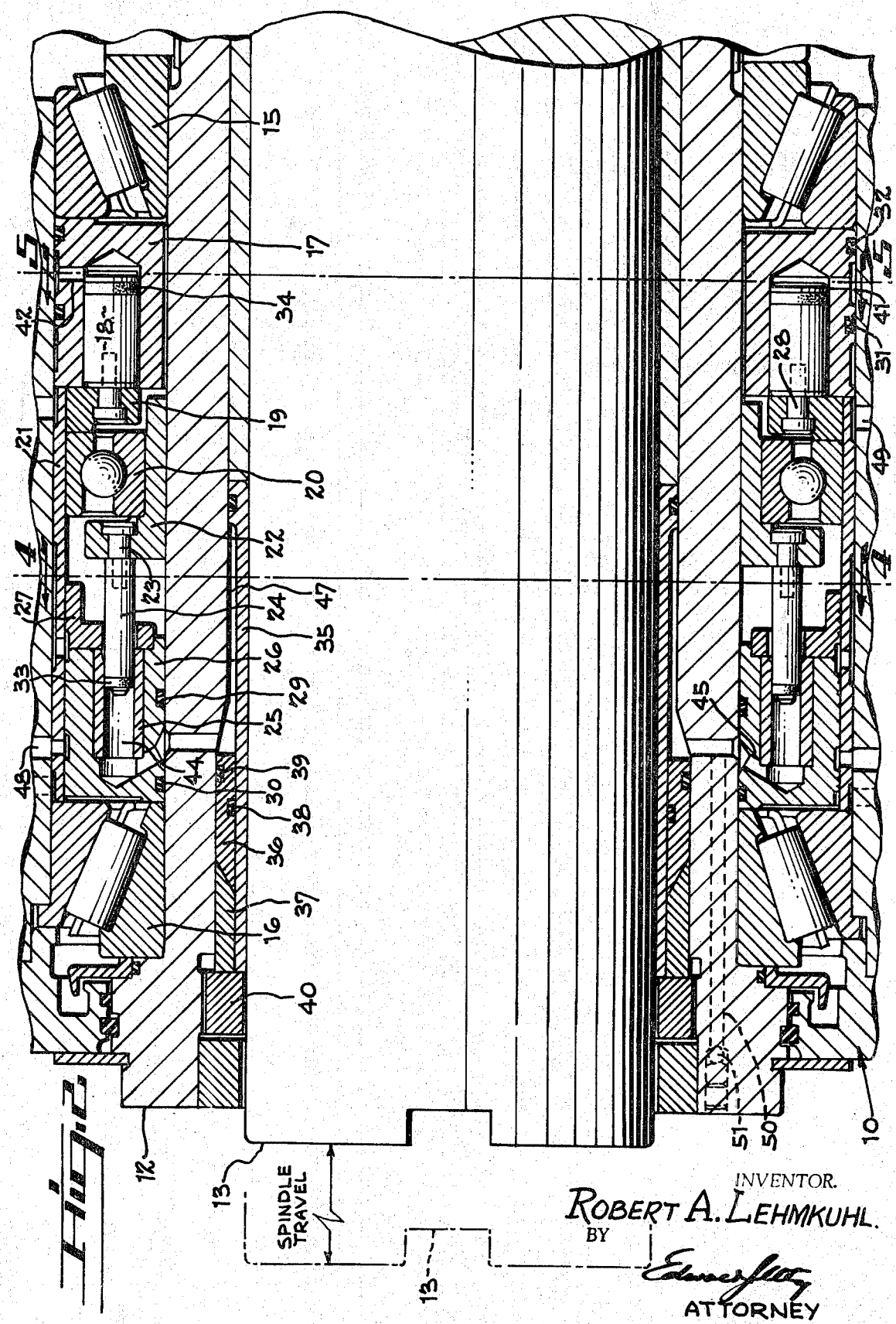
FIG. 2 is a detailed sectional view of the clamp unit.

In FIG. 2 we show in dotted lines the travel of the spindle 13. The spindle may be clamped in any of its extended positions or in its rest position. The head 10 has seated therein roller bearings 15 and 16 within which the sleeve 12 is mounted. Between the bearings is a low-pressure piston housing 17 containing a low-pressure piston 18 with a low-pressure piston ring 19. Adjacent to the low-pressure piston ring 19 is a ball bearing 20 used to transfer thrust generated by the nonrotating low-pressure pistons 18 to the rotating high-pressure pistons 24.

Figure 3:
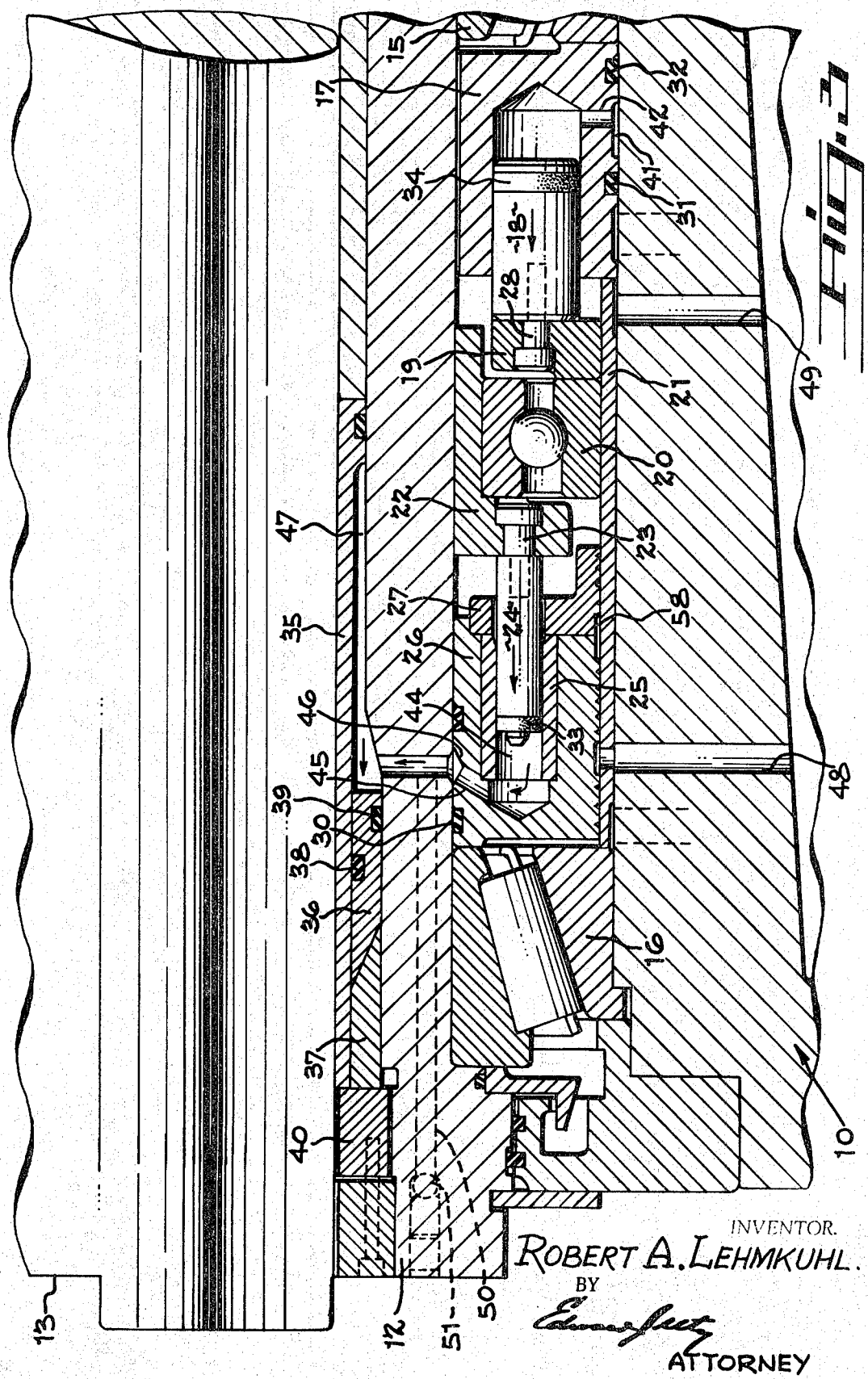
FIG. 3 is an enlarged view of a portion of the clamp unit shown in FIG. 2.
Figure 4:
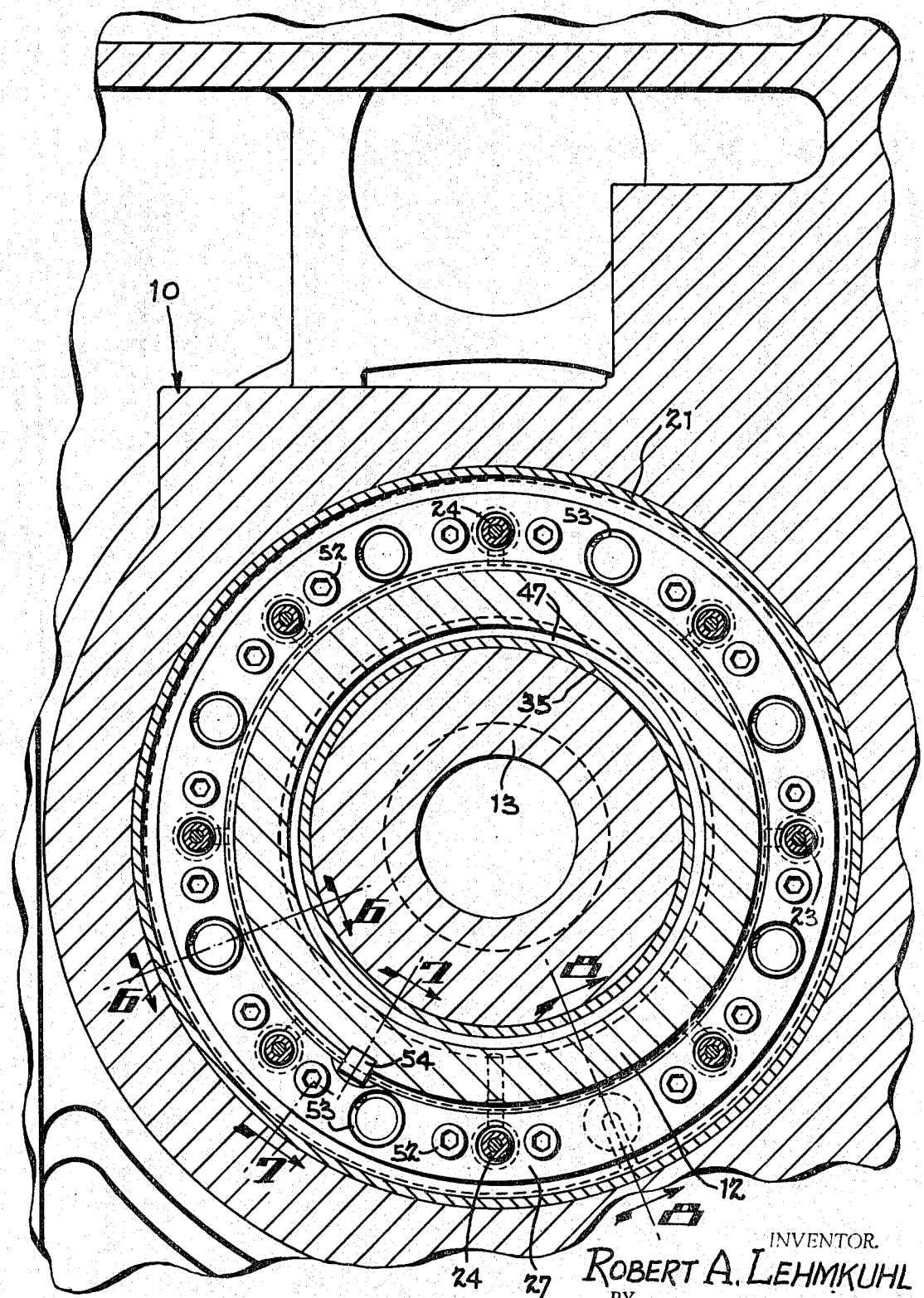
FIG. 4 is a detailed sectional view taken along the lines 4–4 of FIG. 2 and looking in the direction of the arrows at the end of the section line.
Figure 10:
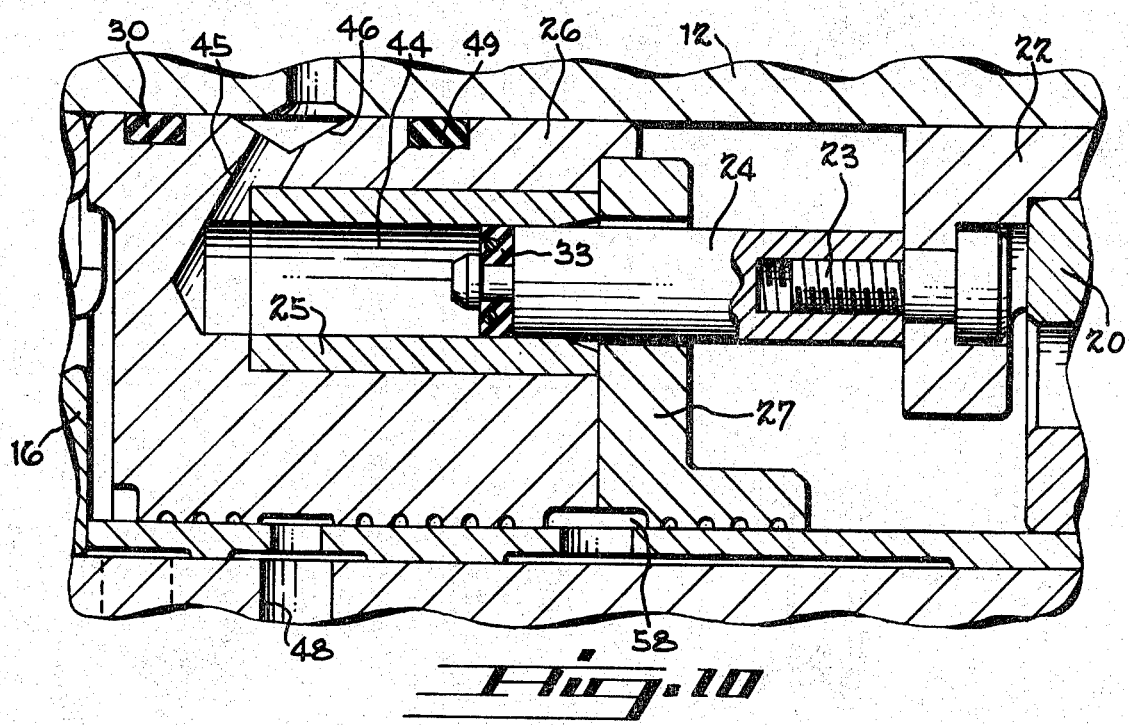
FIG. 10 is an enlarged detailed view of a high pressure piston.
Figure 11:
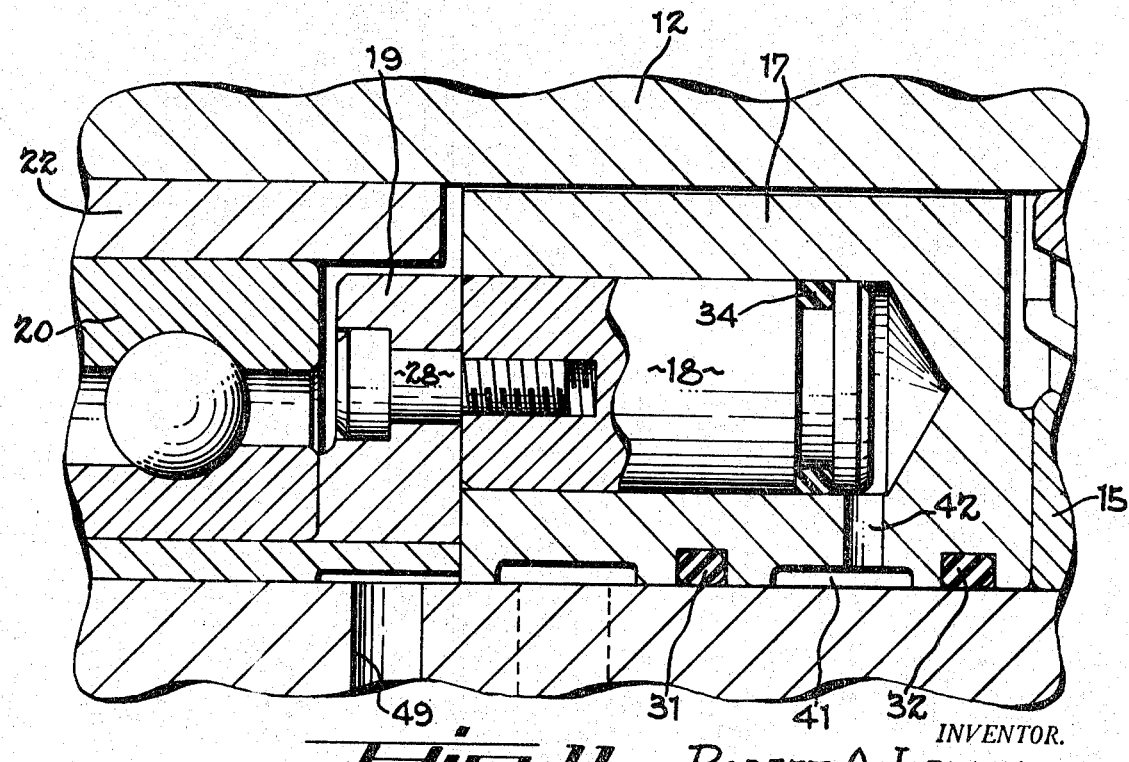
FIG. 11 is a detailed view of the low pressure piston.

A thrust spacing sleeve 21 is mounted between the outer diameter of bearing 16 and low-pressure piston housing 17. Bearing 20 is mounted on a high-pressure piston thrust ring 22. The ring 22 is provided with high-pressure retaining screws 23 which cooperate with pistons 24. Piston 24 slides within bushing 25 which is secured to the high-pressure piston housing 26 and retained by ring 27. I also provide low-pressure piston retaining screws such as 28. High-pressure housing seals 29 and 30 and low-pressure housing seals 31 and 32 and high-pressure piston seals 33 and low-pressure piston seals 34 are provided. The total area of the low-pressure pistons exceeds the total area of the high-pressure pistons to provide pressure amplification in order to simplify the hydraulic mechanism of the entire machine and provide high-pressure in a limited area thereby introducing an added safety factor. Clamping sleeve 35 is compressed around the spindle 13 due to high-pressure oil distorting it and acting against circular wedges 36 and 37. Piston seals 38 and 39 are within the circular wedge 36. Piston wedge 36 and wedge 37 produce both compression of sleeve 35 and rigid centering of spindle 13. This action permits the clamp to provide higher resistance to thrust than using wedges only. The circular wedge 37 is retained in position by means of a thrust nut 40 which is secured within the sleeve 12. Oil is introduced in the low-pressure cylinder shown in FIG. 3 through port 41 through passage 42 into cylinder 18. The oil is introduced into the port 41 through a fitting 43 shown in FIG. 5. The fluid pressure transfers the piston thrust through the bearings into the high-pressure piston area. The high-pressure cylinder is indicated at 44, and carries high-pressure piston 24. The oil is transported into a port 45 through a passage 46 into the clamping area chamber 47. The clamping area chamber area 47 lies between the sleeve 12 and the clamping sleeve 35. Discharge ports 48 and 49 are provided and shown in FIG. 3 for draining the replenishing oil that leaks past mating surfaces of high-pressure housing 26 and retaining ring 37 rotating inside sleeve 21. There is no transfer of fluid from the low-pressure cylinder 18 to the high-pressure cylinder 24. Within the sleeve 12 I provide a passage 50 for venting and testing which has ball plugs 51. In FIG. 4 retaining screws 52 are provided which retain ring 27. I show also in FIG. 4 the piston 24 and retaining screw 23. Low-pressure piston return springs such as 53 are provided which return low-pressure and high-pressure pistons to their unclamped position after clamping pressure has been removed from the low-pressure pistons. The ring 27 is not keyed to the sleeve by key 54 to prevent the ring 27 from driving the housing 26. Key 54 drives high-pressure housing 26. A replenishing fitting 55 is provided and illustrated in FIG. 5. FIG. 6 shows a section through the mounting for the return spring 53. FIG. 7 shows the mounting for key 54 which allows sleeve 12 to drive housing 26 and ring 22. FIG. 8 is a section through the replenishing check valve 56. Hydraulic fitting 55 shown in FIG. 5 introduces oil and replenishing pressure into passage 57 and then into passage 58 (FIG. 8) allowing the replenishing oil to enter the high-pressure chamber through check valve 56 which also prevents flow back of high-pressure oil into the replenishing system, during the clamp cycle. The function of the replenishing system is to recharge the high-pressure chamber at the end of each clamp cycle in the event any loss of oil occurred while being clamped. Passages 48 and 49 illustrated in FIG. 3 are used to recover the oil leakage from the replenishing system described with reference to FIG. 8. In FIG. 9 I show a forced lubricating system for rear bearing 15 showing a channel 59.

I claim:
1. A machine tool having a head, a column, said head slidably mounted upon said column, a spindle adapted to carry a tool mounted within said head, means for driving said spindle and means for clamping said spindle comprising a clamping area chamber, said clamping area chamber interconnected with a high-pressure source for introducing oil into said clamping area chamber, said clamping area chamber including clamping wedges, means for moving said clamping wedges by the high-pressure exerted by said oil, a spindle sleeve within which said clamping wedges are mounted, a clamping sleeve mounted within the spindle sleeve, said clamping wedges surrounding said clamping sleeve, and said clamping sleeve being distorted by the wedging action of the clamping wedges and by direct hydraulic pressure thereon to hold said spindle in a clamped centered position.

2. The device of claim 1 in which the spindle sleeve is mounted within bearings and which when said spindle is clamped said spindle is centered within the true center line of the bearings.

3. The device of claim 1 wherein circular wedges are employed to compress the sleeve to automatically center the spindle.

4. The device of claim 1 having circular wedges, a thrust nut, said thrust nut secured within said sleeve for holding said circular wedges in position.

5. A machine tool having a head, a column, said head slidably mounted on said column, a spindle adapted to carry a tool mounted within said spindle, means for driving said spindle and means for clamping said spindle comprising a low-pressure cylinder, a piston in said low-pressure cylinder, a high-pressure cylinder, a piston in said high-pressure cylinder, said cylinders being mechanically interconnected, a clamping area chamber, said clamping area chamber interconnected with said high-pressure source for introducing oil into said clamping area chamber, said clamping area chamber including clamping wedges, means for moving said clamping wedges by the high-pressure exerted by said oil, a spindle sleeve within which said clamping wedges are mounted; a clamping sleeve mounted within the spindle sleeve, said clamping wedges surrounding said clamping sleeve and said clamping sleeve being distorted by the wedging action of the clamping wedges and by direct hydraulic pressure thereon to hold said spindle in a clamped centered position.